US011171551B2

(12) United States Patent
Pfaller et al.

(10) Patent No.: US 11,171,551 B2
(45) Date of Patent: Nov. 9, 2021

(54) ROTOR HAVING AN INSERT (71) Applicant: SIEMENS AKTIENGESELLSCHAFT, Munich (DE)

(72) Inventors: Maximilian Pfaller, Feucht (DE); Konrad Brandl, Thalmassing (DE); André Trepper, Erlangen (DE)

(73) Assignee: SIEMENS AKTIENGESELLSCHAFT, Munich (DE)

(*) Notice: Subject to any disclaimer, the term of this patent is extended or adjusted under 35 U.S.C. 154(b) by 369 days.

(21) Appl. No.: 15/036,644

(22) PCT Filed: Nov. 6, 2014

(86) PCT No.: PCT/EP2014/073878
§ 371 (c)(1),
(2) Date: May 13, 2016

(87) PCT Pub. No.: WO2015/071156
PCT Pub. Date: May 21, 2015

(65) Prior Publication Data
US 2016/0294264 A1 Oct. 6, 2016

(30) Foreign Application Priority Data

Nov. 14, 2013 (EP) .................................... 13192929

(51) Int. Cl.
*H02K 17/16* (2006.01)
*H02K 15/00* (2006.01)
(52) U.S. Cl.
CPC ....... *H02K 17/165* (2013.01); *H02K 15/0012* (2013.01)

(58) Field of Classification Search
CPC .................. H02K 17/165; H02K 15/0012
USPC .......................................... 310/211
See application file for complete search history.

(56) References Cited

U.S. PATENT DOCUMENTS 2,991,378 A * 7/1961 Barney .............. H02K 15/0012
310/211
8,836,193 B2 * 9/2014 Buttner ................ H02K 17/165
310/125
2011/0316380 A1 12/2011 Buettner et al.

FOREIGN PATENT DOCUMENTS

| CN | 103378672 A | 10/2013 | |
|---|---|---|---|
| JP | 10028360 A * | 1/1998 | ............. H02K 1/265 |
| JP | 10028360 A | 1/1998 | |
| JP | H1028360 A | 1/1998 | |
| RU | 2211520 C2 | 8/2003 | |

(Continued)

*Primary Examiner* — Jianchun Qin
(74) *Attorney, Agent, or Firm* — Henry M. Feiereisen LLC (57) ABSTRACT A rotor for an electric machine includes a laminated core and a groove which extend in axial direction from a first axial end to a second axial end along a rotation axis. The groove has a groove filling having a first material with a metal element of the periodic table. The groove filling has a cast metal region, which extends with an end region at the first axial end at least partially over the laminated core. The cast metal region extends through the groove from the first axial end to the second axial end, and fills up a first part of the groove with a first material. An insert fills up a second part of the groove with a second material which has the metal element of the periodic table. The insert part and the cast metal region are connected in a bonded manner by a connection zone.

11 Claims, 6 Drawing Sheets (56) References Cited

FOREIGN PATENT DOCUMENTS

RU 2309516 C2 10/2007
RU 80079 U1 1/2009

* cited by examiner

FIG. 2B

2 Laminated Core
16 Groove
7 Laminations
10 Insert
14 Aperture
8 First Material
12 Second Material 3 Axial Direction

ROTOR HAVING AN INSERT

CROSS-REFERENCES TO RELATED APPLICATIONS

This application is the U.S. National Stage of International Application No. PCT/EP2014/073878 filed Nov. 6, 2014, which designated the United States and has been published as International Publication No. WO 2015/071156 and which claims the priority of European Patent Application, Serial No. 13192929.1, filed Nov. 14, 2013, pursuant to 35 U.S.C. 119(a)-(d).

BACKGROUND OF THE INVENTION

The invention relates to a rotor for an electric machine, which rotor comprises a laminated core, which has laminations arranged in an axial direction and a groove,
wherein the laminated core and the groove extend in the axial direction from a first axial end to a second axial end along an axis of rotation,
wherein the groove has a groove filling, which comprises a first material,
wherein the first material has a metal element of the periodic table,
wherein the groove filling has a cast metal region, which extends at least partially over the laminated core perpendicularly to the axial direction in a first direction.

Furthermore, the invention relates to a series of rotors with the rotor, an insert for the rotor, an electric machine with the rotor, and a method for producing the rotor and a use of the insert for the rotor.

The groove of such rotors is essentially completely filled with one or more components as a groove filling, the materials of which have the metal element of the periodic table. The majority of the groove filling may thus have similar material properties which co-determine the quality of the rotor without major structural measures. It may thus, for example, have groove filling components with similar thermal expansion coefficients which result in lower mechanical stress inside the rotor when it heats up and consequently to a lower risk of damage to the rotor.

Such a rotor is also known from the publication JP 10 028360 A. The publication is based on the starting point that the coupling phenomenon between different metals, i.e. the formation of a high-impedance reaction layer, was not taken into account in cage rotors with aluminum and copper. This results in a deterioration of the motor specifications. The publication describes how the efficiency of a motor is improved by the cage rotor as a result of the fact that a copper rod coated with aluminum or an aluminum rod takes up approx. 70% of a groove and the remainder of the groove is filled with cast aluminum. Here it was described how the reaction layer does not form on either the coated copper rod or the aluminum rod. When using the aluminum rod, a high-resistance reaction layer is avoided on account of the same material for the rod and the pressure die casting. In addition, the aluminum rod has high electrical conductivity as it does not have any cavities like those which occur in die-cast aluminum. This contributes to a highly-efficient rotor for an electric machine.

SUMMARY OF THE INVENTION

The object of the invention is therefore to provide a high-quality rotor for an electric machine which can be produced cost-effectively.

According to one aspect of the invention, the object is achieved by a rotor for an electric machine, including
a laminated core, which has laminations arranged in an axial direction and a groove,
wherein the laminated core and the groove extend in the axial direction from a first axial end to a second axial end along an axis of rotation,
wherein the groove has a groove filling which comprises a first material,
wherein the first material has a metal element of the periodic table,
wherein the groove filling has a cast metal region which extends at least partially over the laminated core perpendicularly to the axial direction in a first direction by means of an end region at the first axial end,
wherein the cast metal region extends through the groove from the first axial end to the second axial end and fills up a first part of the groove with a first material perpendicularly to the axial direction in the first direction,
wherein an insert fills up a second part of the groove with a second material perpendicularly to the axial direction in the first direction,
wherein the second material has the metal element of the periodic table,
wherein the insert and the cast metal region are connected in a bonded manner by means of a connection zone.

According to another aspect of the invention, the object is also achieved by a series of rotors for at least one electric machine, having has a first rotor according to the invention and a second rotor, wherein the second rotor
has a second laminated core which has laminations arranged in an axial direction and a second groove,
wherein the second laminated core and the second groove extends in the axial direction from a third axial end to a fourth axial end along an axis of rotation,
wherein the second groove has a second groove filling which comprises a fourth material,
wherein the fourth material has the metal element of the periodic table,
wherein the second groove filling has a cast second metal region which extends at least partially over the second laminated core perpendicularly to the axial direction in a first direction by means of a second end region at the third axial end,
wherein a first volume which comprises the volume of the cast metal region and the volume of the insert is greater than a second volume which comprises the volume of the cast second metal region.

According to yet another aspect of the invention, the object is also achieved by an insert for a rotor according to the invention.

According to yet another aspect of the invention, the object is also achieved by an electric machine which includes a rotor according to the invention and a stator.

According to yet another aspect of the invention, the object is also achieved by a method for producing a rotor according to the invention, when casting the cast metal region the insert and the cast metal region are connected in a bonded manner by means of a connection zone.

According to yet another aspect of the invention, the object is also achieved by the use of an insert for a rotor according to the invention.

A rotor according to the invention achieves the object advantageously in that a high-quality rotor can be supplied with minimal material and manufacturing costs by means of the cast metal region, the insert and its bonded connection by means of the connection zone. A high-quality rotor according to the invention can be produced advantageously cost-effectively using a method in which casting of the cast metal region takes place from one of the axial ends of the laminated core. Advantageously, a cost-effective device can be used for casting the cast metal region as the device has to generate a smaller amount of a liquid first material and transport it into the groove.

A rotor according to the invention can have a shaft for rotation of the rotor around the axis of rotation which extends along the axis of rotation and to which the laminated core is fastened.

The connection zone has metal bonds between the first material and the second material which connect the insert and the cast metal region in a bonded manner.

The insert may predominantly consist of the second material. Thus, advantageously and cost-effectively a piece of the second material may be used as the starting point for the production of the insert as the piece predominantly fills out the volume of the insert. Thus, advantageously only small or no amounts of additional materials need be attached to the insert. Small amounts of materials may be attached, for example, during the production of the insert by coating the surface of the insert with a third material.

The cast metal region may consist of the first material. Thus, the cast metal region may be advantageously cost-effectively cast in one piece.

A material, for example, an alloy, may have various elements, for example, various metal elements, of the periodic table. The mass fraction of an element of the periodic table of the material is calculated by dividing the mass of the percentage of the element of the material by the total mass of the material. A mass fraction as a percentage is calculated by dividing the mass of the percentage of the element of the material by the total mass of the material and multiplying by 100. In particular, these calculations of the mass fraction apply to an alloy as the mass fraction is more informative in the case of an alloy than in the case of other materials in which the various elements of the periodic table are associated with lower forces than in the case of metal bonds. An alloy is a metal which has properties typical of metal. An alloy is therefore also a material in which the mass fraction of a metal element of the periodic table is at least 99%. A metal element of the periodic table can have a mass fraction greater than 0% to almost 100% in an alloy. If the connection zone has different mass fractions of a metal element of the first material and a material of the surface of the insert, the connection zone can advantageously be an alloy zone. The material of the surface of the insert is the second material or the third material. The latter if the surface of the insert has been coated with the third material as a result of the production of the insert. The alloy zone has at least one metallic phase in which a stoichiometric composition different in comparison to the first material and the material of the surface of the insert can be discerned. The surface of the insert is generally understood to mean the surface of the insert before casting of the cast metal region.

The laminated core may comprise additional grooves which extend in the axial direction from the first axial end to the additional axial end along the axis of rotation, wherein the additional grooves have groove fillings. Thus, the additional grooves can advantageously be filled cost-effectively with the first material from one of the axial ends.

The cast metal region may comprise cast sections which extend in the additional grooves from the first axial end to the second axial end and fill up first parts of the additional grooves with the first material perpendicularly to the axial direction in the first direction. Thus, the groove fillings of the additional grooves have cast sections, wherein additional inserts fill up second parts of the additional grooves with the second material perpendicularly to the axial direction in the first direction and the additional inserts and the cast sections are connected in a bonded manner by means of additional connection zones. Thus, the groove fillings of the first part of the groove and the corresponding first parts of the additional grooves can be advantageously cast cost-effectively in a high quality from the first material and the insert and the additional inserts and their bonded connections by means of the connection zones produced in a high quality with low material and manufacturing costs.

The end region of the cast metal region can connect the cast metal region with the cast sections to a short circuit ring in a bonded manner by means of the first material. Thus, the short circuit ring can advantageously be produced cost-effectively in a high quality for operation of an electric machine.

The cast metal region in an additional end region at the second axial end can extend at least partially over the laminated core perpendicularly to the axial direction in a first direction. Thus, with regard to the length of the rotor, which is measured between the first and the second axial end of the rotor, a rotor according to the invention can be advantageously produced cost-effectively in a high quality at the first and at the second axial end. In contrast, a rotor according to the invention which arises as a result of juxtaposing laminated cores would not be produced if the short circuit ring is only cast at one of the axial ends on two laminated cores in each case. Here the at least two laminated cores would still have to be connected for the production of the rotor with regard to the length of the rotor.

A composite part has the cast metal region and the insert connected to the cast metal region in a bonded manner by means of the connection zone.

Advantageously the composite part may also have the additional inserts. The composite part may advantageously form the groove fillings of the groove and the additional grooves, in particular of all the grooves which extend in the axial direction from a first axial end to a second axial end along an axis of rotation. Thus, the necessary groove fillings can be advantageously produced using a method for producing a rotor according to the invention by inserting the insert and the additional inserts and by casting the cast metal region.

A series of rotors according to the invention for at least one electric machine also has the additional advantage that the series which has a second rotor can be cost-effectively expanded to include the rotor with the insert as a first rotor. Inter alia, no new device for casting the cast metal region need be acquired if an existing device for casting the cast metal region in a groove filling of the first rotor without an insert is unable to provide the first material in sufficient quantity for a high-quality rotor. If the second rotor comprises a second insert, the second volume comprises the volume of the cast second metal region and the volume of the second insert. The volume of the insert may then be advantageously greater than the volume of the second insert so that no new device for casting the cast metal region needs to be acquired. If the first rotor has additional inserts in additional grooves, then the first volume also comprises the volumes of the additional inserts. The same also applies to the second rotor if it has additional inserts.

An insert according to the invention for a rotor according to the invention also has the additional advantage that the insert can be produced cost-effectively in a high quality regardless of the production of the rotor.

An electric machine according to the invention also has the additional advantage that the cast metal region, the insert and its connection in a bonded manner by means of a connection zone cost-effectively enables an advantageous, high-quality magnetic interaction between the rotor and the stator by way of an air gap. The cast metal region, the insert and its connection in a bonded manner by means of a connection zone can advantageously support the compression of the laminated core for this purpose.

The air gap is delimited in direction perpendicularly to the axial direction by the stator and the rotor. The rotor may have a facility in order to be able to magnetically interact with the stator, in particular with a winding fastened to the stator, by way of the air gap. The facility may have a permanent magnet and/or a winding for this purpose.

In an electric machine according to the invention, the facility may advantageously cost-effectively have a shading coil which comprises the cast metal region, the insert and the connection zone.

In an electric machine according to the invention the shaft may be stored in a first end shield with the aid of a first storage device and in a second end shield with the aid of a second storage device. The end shields or a housing which has the end shields can thus be used advantageously as a torque support.

When operating an electric machine according to the invention as a generator, the rotor is set in rotation around the axis of rotation by means of mechanical energy. As a result of the magnetic interaction between the rotor and the stator, the mechanical energy can be converted into electrical energy. The electrical energy can be removed on the winding which is fastened to the stator through the connection of an electrical load.

When operating an electric machine according to the invention as a motor, electrical energy is supplied by way of the winding and converted into mechanical energy by means of the magnetic interaction between the stator and rotor electrical energy. The rotor is set in rotation around the axis of rotation and mechanical energy in the form of a rotation can be released on the shaft to a mechanical load.

A method according to the invention for producing a rotor according to the invention also has the additional advantage that a smaller amount of energy is necessary for the production of the groove filling and the end region of the cast metal region.

A use according to the invention of an insert according to the invention also has the additional advantage that the insert can advantageously be used cost-effectively for a high-quality rotor without a rotor, in particular a laminated core, having to be structurally modified for the use of the insert.

Advantageous embodiments of the invention are specified in the dependent claims.

Thus, an embodiment of a rotor according to the invention in which the second material has a lower melting point than the first material is advantageous. A high-quality rotor can thus be advantageously obtained cost-effectively. Inter alia, during production of the rotor or during casting, in particular pressure die-casting, of the cast metal region, the cast metal region can be cost-effectively connected in a bonded manner by means of a connection zone to the insert with connection properties of an advantageously high quality on account of the higher melting temperature of the first material compared with the second material. The higher temperature of a melt of the first material compared with the melting point of the second material enables better melting or fusing of a surface of the insert In a further advantageous embodiment of a rotor according to the invention the first material has a lower melting point than the second material. A high-quality rotor can thus be advantageously obtained cost-effectively. During production of the rotor or during casting, in particular pressure die-casting, of the cast metal region, on account of its lower melting point the first material can be made available in a sufficiently liquid state in a sufficient quantity as melt for the high-quality advantageously homogenously cast metal region, in particular advantageously for the end region and advantageously for the possible additional end region of the cast metal region, and for the bonded connection with connection properties of an advantageously high quality. Advantageously, the melt does not solidify as quickly as in cases in which the first material has a higher melting point. A further advantage is that the short circuit ring can thus be advantageously produced cost-effectively in a high quality for the operation of an electric machine. The high electrical conductivity and mechanical strength of the cast metal region contribute to the high operating quality and can be obtained by the first material being made available in a sufficiently liquid state in a sufficient quantity as melt for the production of the rotor on account of its lower melting point. Advantageously, this can also apply to the additional end region of the cast metal region if a rotor according to the invention is produced using a method in which casting of the cast metal region takes place from the first axial end of the laminated core.

In a further advantageous embodiment of a rotor according to the invention, the connection zone has an additional metal element of the periodic table. Advantageously, a mechanically stable connection is obtained by means of a third material which has the additional metal element, wherein the material properties of the first and second material advantageously do not alter or have to be altered or only to a limited extent. A high-quality rotor can thus be advantageously obtained cost-effectively. Advantageously, during the production of the insert a surface of the insert is coated with the third material which has the additional metal element of the periodic table. In a method for producing the rotor, the coating can then be advantageously melted or fused with the first material during casting, in particular pressure die-casting, of the cast metal region. Thus, the connection zone of the rotor produced can then have the additional metal element of the periodic table. In particular; the additional metal element is not present or unevenly distributed in the first material of the cast metal region and/or the second material of the insert.

The third material may have a lower melting point than the first material. Thus, the first material may be advantageously connected to the insert cost-effectively in a bonded manner by means of a connection zone with connection properties of an advantageously high quality.

Advantageously, apart from the metal element the second material of the insert may not have any impurities or only a very small mass fraction as a result of elements of the periodic table from the first material. Thus, the original material properties of the second material can be advantageously retained by cost-effectively only fusing the coating with the first material in a method for producing the rotor during casting, in particular pressure die-casting, of the cast metal region.

In a further advantageous embodiment of a rotor according to the invention one end of the insert extends into the end region of the cast metal region and the end of the insert is connected to the cast metal region in a bonded manner by means of a connection zone. As a result of the extension of the insert into the end region of the cast metal region, the first material must be heated to a lower temperature in order to obtain a connection in a bonded manner by means of a connection zone with connection properties of an advantageously high quality. As the cast metal region in the end region extends at least partially over the laminated core perpendicularly to the axial direction in the first direction, in the end region temperature losses of a melt of the first material are lower than in the groove. The first material can only be advantageously heated cost-effectively to a temperature which ensures the formation of a high-quality connection in a bonded manner by means of a connection zone outside the groove.

The cast metal region with an additional end region at the second axial end may extend at least partially over the laminated core perpendicularly to the axial direction in the first direction, wherein an additional end of the insert extends into the additional end region of the cast metal region and the additional end of the insert and the cast metal region are connected in a bonded manner by means of a connection zone. This may advantageously contribute to the laminated core being held together mechanically resistantly against environmental influences and more cost-effective production of the rotor being possible. The first part of the groove may then have a lower extension in the direction perpendicularly to the axial direction as the cast metal region has to contribute to the mechanically resistant holding together of the laminated core to a lesser extent. As a result of this, inter alia, a cost-effective device for casting the cast metal region can be used as the device can advantageously cost-effectively produce the cast metal region from a smaller amount of first material.

In a further advantageous embodiment of a rotor according to the invention, the first material predominantly has a first alloy in which the metal element of the periodic table has the greatest mass fraction. A high quality rotor can thus be advantageously obtained cost-effectively as a first material can be used for casting the cast metal region which advantageously combines cost-effectively with the insert to form the connection in a bonded manner by means of a connection zone. Advantageously, devices and methods for producing the rotor, in particular for casting the cast metal region, need only be slightly adjusted. In particular, an adjustment can only exist advantageously cost-effectively by means of the use of another first material for casting the cast metal region.

The mass fraction of the metal element of the periodic table of the first alloy may be at least 80%. Advantageously cost-effectively, a high-quality rotor according to the invention can thus be obtained by a small mass fraction of the first alloy advantageously having an additional element of the periodic table.

Advantageously, the small mass fraction of the first alloy may have an additional element of the periodic table, the mechanical strength of the cast metal region thus being greater than in the case of a cast metal region with comparable dimensions which predominantly has one alloy in which the mass fraction of the metal element is greater than 98%. This may advantageously contribute to the laminated core being held together mechanically resistantly against environmental influences and more cost-effective production of the rotor being possible. The first part of the groove may then extend less in the direction perpendicularly to the axial direction as advantageously the cast metal region can already exert the necessary force for the mechanically resistant holding together of the laminated core with a smaller cross section. As a result of this, inter alia, a cost-effective device can be used for casting the cast metal region as the device can advantageously produce the cast metal region cost-effectively from a smaller amount of first material.

Advantageously, the mass fraction of the metal element of the periodic table of the first alloy may be at least 98%. Advantageously cost-effectively, a high-quality rotor according to the invention can thus be obtained as on account of the mass fraction of at least 98%, the material properties, for example, electrical conductivity for use of the rotor in a highly efficient electric machine, are so strongly pronounced in the first material that the first part in the groove must have a small extension for a rotor to be of high quality. As a result of this, inter alia, a smaller amount of liquid first material is required when casting the cast metal region. For example, to cast the cast metal region an alloy with a mass fraction of at least 99% of the metal element of the periodic table of the first alloy can be used.

In a further advantageous embodiment of a rotor according to the invention the second material predominantly has a second alloy in which the metal element of the periodic table has the greatest mass fraction. A high-quality rotor can thus be advantageously obtained cost-effectively as a second material can be used for the insert which advantageously combines cost-effectively with the insert to form the connection in a bonded manner by means of a connection zone. Advantageously, devices and methods for producing the rotor, in particular for casting the cast metal region, need only be slightly adjusted. In particular, an adjustment can only exist advantageously through the use of an insert of another second material.

The mass fraction of the metal element of the periodic table of the second alloy may be at least 99%. A high-quality rotor according to the invention can thus be obtained which is advantageously cost-effectively comparable with the quality of a rotor with a groove filling comprising a cast metal region. The first part in the groove can advantageously have a small extension. As a result of this, inter alia, a smaller amount of liquid first material is required when casting the cast metal region.

In a further advantageous embodiment of a rotor according to the invention, the second material is the same as the first material. A quality can thus be obtained for a rotor according to the invention which is advantageously cost-effective compared to the quality of a comparable rotor with a groove filling comprising a cast metal region of the first material. As the groove fillings of the comparable rotor and the groove filling in this advantageous embodiment significantly differ at most in their mass fractions of elements of the periodic table in the connection zone, the rotor according to the invention can advantageously cost-effectively replace the comparable rotor.

In a further advantageous embodiment of an electric machine according to the invention, the metal element of the periodic table is aluminum. The first material can thus be processed cost-effectively as the first material with the metal element aluminum is advantageously cost-effective and enables cost-effective casting of the cast metal region. Inter alia, the first material with the metal element aluminum may have a low melting point and be cost-effective to procure. In particular, the melting point of the first material may be lower than 800° C.

In a further advantageous embodiment of a rotor according to the invention, a composite part has the cast metal region and the insert, wherein the mass of the composite part is greater than 80 kg, in particular greater than 92 kg. A rotor with such a large mass or equivalent to such large dimensions can advantageously be cast cost-effectively using a device for casting the cast metal region which in a step during casting, in particular during pressure die-casting, of the cast metal region can transport 80 kg maximum, notably 92 kg, into the groove of the rotor.

In a further advantageous embodiment of a series of rotors according to the invention, the second rotor has a second composite part which has the cast second metal region and a second insert, wherein the geometric dimensions of the second insert are like the geometric dimensions of the insert. Thus, prefabricated sections can be advantageously used cost-effectively for rotors of a series with different dimensions.

In a further advantageous embodiment of a method for producing a rotor according to the invention, at the first axial end of the laminated core a first tool is arranged which shapes the end region. Furthermore, at the second axial end of the laminated core a second tool is arranged which shapes the additional end region. Advantageously cost-effectively, in a step the first material is transported only by way of one aperture or several apertures of the first tool from the device for casting, in particular pressure die-casting, of the cast metal region into the first tool and transported to the second axial end by way of the groove. After the first material has solidified in the first tool, the laminated core and the second tool, the cast metal region with the end region and the additional end region can advantageously consist of the first material.

In an advantageously cost-effective manner a die-casting method can be used in the method for producing a high-quality rotor by having the first material transported using a die-casting method in the first tool. In a die-casting method, inter alia, the first material is transported in the first tool in a liquid state under high pressure, in particular in the pressure range of 10 MPa to 200 Mpa. Accordingly, a device for pressure die-casting is advantageously more cost-effective if the mass of the first material to be transported under pressure is small according to the invention.

Advantageous embodiments of rotors according to the invention, series of rotors according to the invention, inserts according to the invention, and electric machines according to the invention, as well as methods according to the invention for producing rotors according to the invention and the use of an insert according to the invention result advantageously from a combination of one or more features described.

BRIEF DESCRIPTION OF THE DRAWING

The aforementioned properties, features and advantages of this invention, and the manner in which these are obtained will be clearer and more understandable in connection with the following description of the exemplary embodiments which are explained in more detail with reference to the figures. The figures show.

DETAILED DESCRIPTION OF PREFERRED EMBODIMENTS

Figure 1:
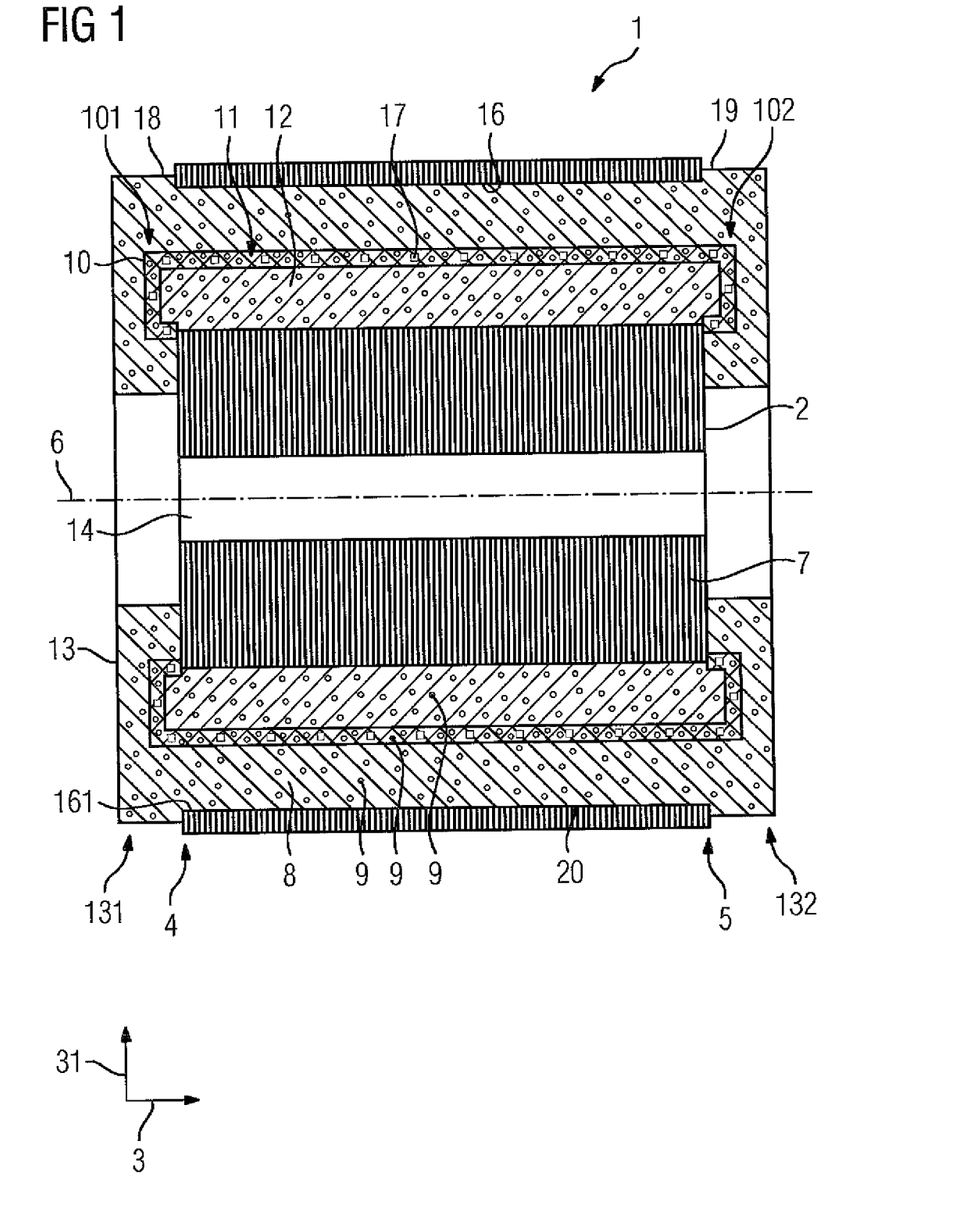
FIG. 1 an exemplary embodiment of a rotor having an insert.

FIG. 1 shows an exemplary embodiment of a rotor 1 for an electric machine 43 which comprises a laminated core 2 which has laminations 7 arranged in an axial direction 3 and a groove 16. The laminated core 2 and the groove 16 extend in the axial direction 3 from a first axial end 4 to a second axial end 5 along an axis of rotation 6, wherein the groove 16 has a groove filling which comprises a first material 8. The first material 8 has a metal element 9 of the periodic table which in the exemplary embodiment of the rotor 1 is aluminum. The groove filling has a cast metal region 13 with an end region 18 at the first axial end 4 which extends at least partially over the laminated core 2 perpendicularly to the axial direction 3 in a first direction 31, wherein the cast metal region 13 extends through the groove 16 from the first axial end 4 to the second axial end 5 and fills up a first part of the groove 16 with a first material 8 perpendicularly to the axial direction 3 in the first direction 31. An insert 10 fills up a second part of the groove 16 with a second material perpendicularly to the axial direction 3 in the first direction 31, wherein the second material 12 has the metal element 9 of the periodic table. The insert 10 and the cast metal region 13 are connected in a bonded manner by means of a connection zone 11. The groove filling of the groove 16 of the rotor 1 according to the exemplary embodiment comprises the cast metal region 13, the insert 10 and, if applicable, the connection zone 11, wherein the cast metal region 13 comprises the first material 8. The connection zone 11 may not be present in the groove 16 or only imperfectly formed if, for example, greater temperature losses of a melt occur in the groove 16 when casting the cast metal region 13 which fail to ensure the formation of a high-quality connection in a bonded manner by means of the connection zone 11 in the groove 16. Accordingly, the connection zone 11 may have a break in the axial direction 3 which separates the connection zone 11 into a connection zone 11 at one end of the first insert 10 and an additional connection zone at an additional end of the first insert 10. In the exemplary embodiment of FIG. 1 the first part of the groove 16 is directly adjacent to the edges of the laminations 7 of the laminated core 2 closer to the axis of rotation 6 in the first direction 31. As the first material 8 is not present on these edges of the laminations 7 or only to a limited extent, no connection zone 11 is formed there. On these edges of the laminations 7 the insert 10 still has a metal coating 22 on its surface which for the sake of simplicity is not shown in FIG. 1, FIG. 4 and FIG. 5, however. The atoms of the metal element 9 of the periodic table are represented symbolically in the figure by unfilled small circles.

The rotor 1 of FIG. 1 comprises additional grooves which extend in the axial direction 3 from the first axial end 4 to the additional axial end 5 along the axis of rotation 6, wherein the additional grooves have groove fillings. The cast metal region 13 comprises cast sections 20 which extend in the additional grooves 161 from the first axial end 4 to the second axial end 5 and fill up first parts of the additional grooves 161 with the first material perpendicularly to the axial direction 3 in the first direction 31. Thus, the groove fillings of the additional grooves 161 have the cast sections 20, wherein additional inserts fill up second parts of the additional grooves 161 with the second material 12 perpendicularly to the axial direction 3 in the first direction 31 and the additional inserts and the cast sections 20 are connected in a bonded manner by means of additional connection zones.

A composite part has the cast metal region 13 and the insert 10 connected to the cast metal region 13 in a bonded manner by means of the connection zone 11. The composite part also has the additional inserts. The composite part forms the groove fillings of the groove 16 and the additional grooves 161, in particular of all the grooves which extend in the axial direction 3 from a first axial end 4 to a second axial end 5 along an axis of rotation 6.

One end 101 of the insert 10 extends into the end region 18 of the cast metal region 13, wherein the end 101 of the insert 10 and the cast metal region 13 are connected in a bonded manner by means of the connection zone 11. The cast metal region 13 extends with an additional end region 19 at the second axial end 5 at least partially over the laminated core 2 perpendicularly to the axial direction 3 in the first direction 31, wherein an additional end 102 of the insert 10 extends into the additional end region 19 of the cast metal region 13 and the additional end 102 of the insert 10 and the cast metal region 13 are connected in a bonded manner by means of an additional connection zone. The additional connection zone and the connection zone are shown in the figures as a continuous connection zone 11 from the end 101 of the insert 10 to the additional end 102 of the insert. However, the continuous connection zone 11 can be separated into at least two parts if the insert 10 only has the metal coating 22 at the end 101 and the additional end 102 before casting of the cast metal region 13 or the connection zone 11 is not present in the groove 16 or is only imperfectly formed. The at least two parts of the connection zone 11 each has a joint face with the insert 10 and each has a joint face with the cast metal region 13. The respective surface area of the joint faces taken alone is at least as large as the surface area of a cross-sectional area of the insert 10. Thus, the bonded connection can be made available with connection properties of advantageously high-quality.

The rotor 1 has an aperture 14 for a shaft, wherein the aperture 14 extends through the rotor 1 in the axial direction 3.

The connection zone 11 has an additional metal element 17 of the periodic table which is tin. The atoms of the additional metal element 17 of the periodic table are represented symbolically in the figure by unfilled small rectangles. The additional metal element 17 is not present in the first material 8 of the cast metal region 13 and/or the second material 12 of the insert 10 or unevenly distributed.

In the exemplary embodiment of the rotor 1 the first material predominantly has a first alloy in which the metal element 9 of the periodic table has the greatest mass fraction. The mass fraction of the metal element of the periodic table of the first alloy is at least 99%. The first alloy advantageously enables cost-effective production of a high-quality rotor 1 for an electric machine 43 by means of a die-casting method. The first alloy may have impurities as a result of elements of the periodic table such as, for example, silicon, iron, copper, zinc or titanium as additional mass fractions. The first material 8 may also have impurities from the melt of the first material 8 as a result of casting of the cast metal region 13. The second material 12 predominantly has a second alloy in which the metal element 9 of the periodic table has the greatest mass fraction. The second material 12 is the same as the first material 8. However, this does not necessarily relate to impurities of the first material 8 and the second material 12 as the impurities may be caused by variations in a production process of the first material 8 and second material 12 or advantageously be less than in the cast metal region 13 as a result of the use of the insert 10 in the second material 12. An alloy with a mass fraction of at least 99.5% aluminum is therefore used to cast the cast metal region 13 of the rotor 1 according to the exemplary embodiment. A part with a mass fraction of at least 99.5% aluminum is produced from an alloy as a starting point for production of the insert 10.

Figure 2A:
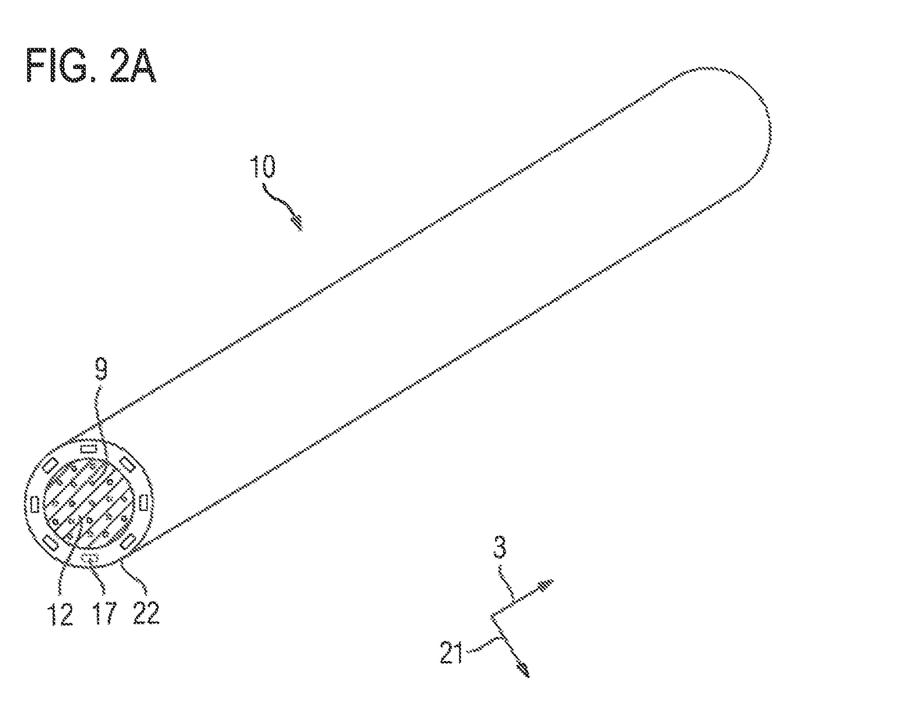
FIG. 2A an exemplary embodiment of an insert for the rotor.

FIG. 2A shows an exemplary embodiment of an insert 10 for the rotor 1. On its surface the insert 10 has the metal coating 22 which has the additional metal element 17 of the periodic table. The insert 10 extends in the axial direction 3 and has the cross-sectional area of the insert 10 which is circular and in which a first direction extends perpendicularly to the axial direction 3 in a first direction 21. The metal coating 22 essentially covers the surface of the insert 10 which comprises the base area and the top surface and the lateral surface of the cylindrical insert. In a method for producing the insert 10, the surface is coated with a third material which has the additional metal element 17 of the periodic table. The third material is tin. In a method for producing the rotor 1, the coating 22 is then melted or fused with the first material 8 during casting, in particular pressure die-casting, of the cast metal region 13. Thus, the connection zone 11 of the rotor 1 shown in FIG. 1 can then have the additional metal element 17 of the periodic table.

Figure 2B:
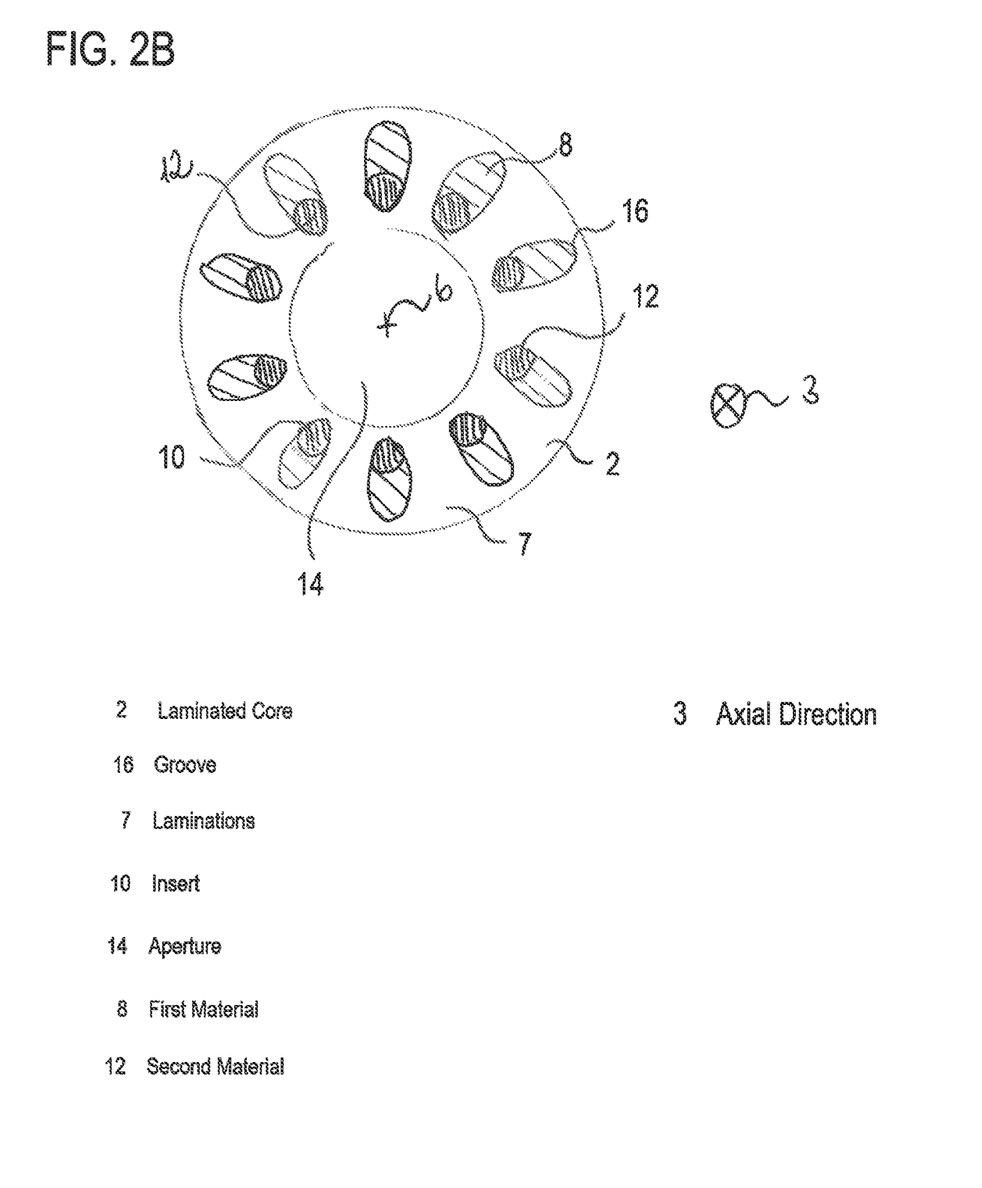
FIG. 2B an exemplary embodiment of a cross section of the laminated core of the rotor of FIG. 1, FIG. 3 an exemplary embodiment of a device for pressure die-casting of a cast metal region with a laminated core and an insert in a first and a second tool, FIG. 4 an exemplary embodiment of an electric machine with the rotor, FIG. 5 an exemplary embodiment of a series of rotors for at least one electric machine.
Figure 3:
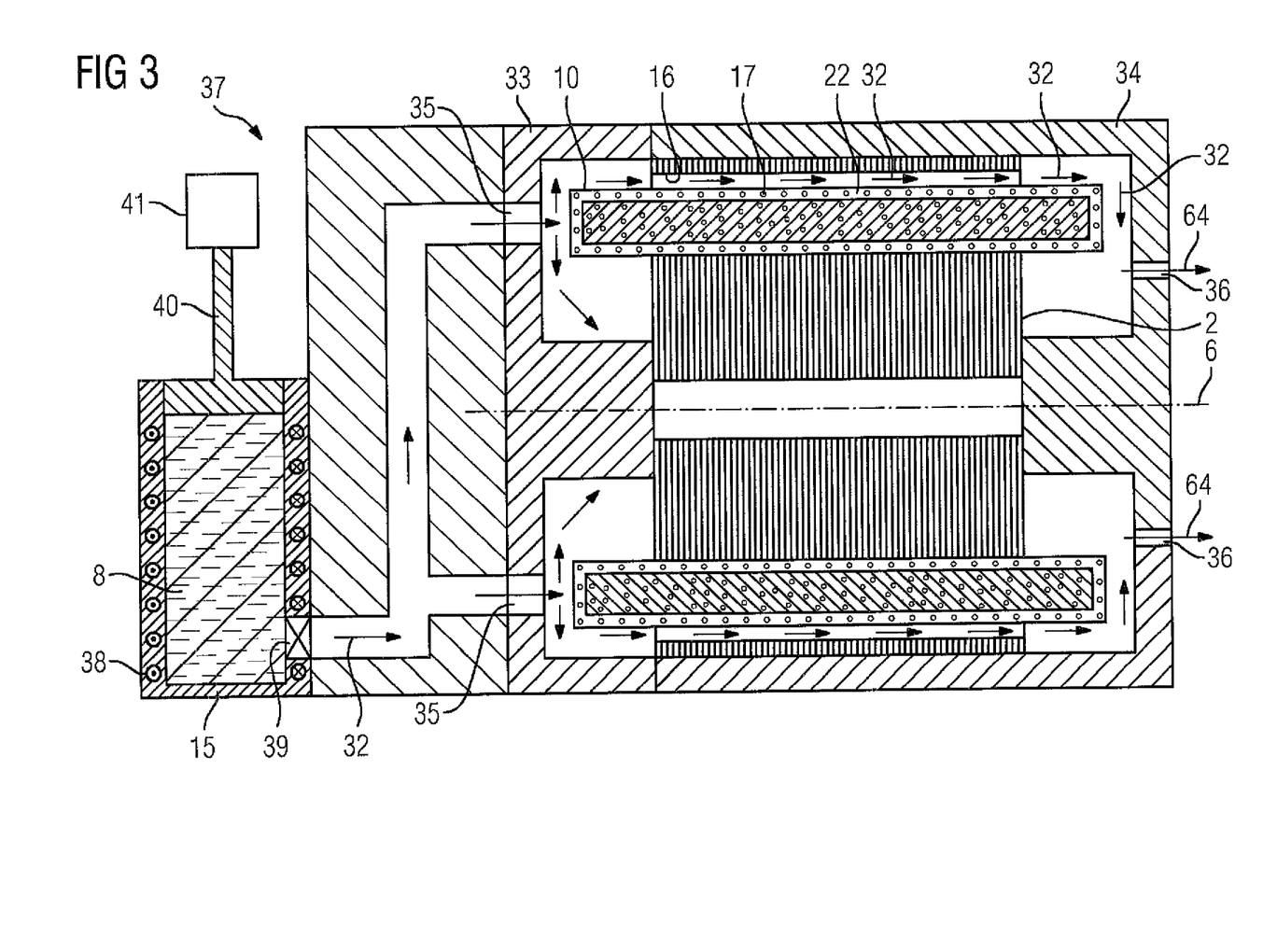

FIG. 2B shows an exemplary embodiment of a cross section of the laminated core 2 of the rotor 1 of FIG. 1. The rotor 1 has an aperture 14 for a shaft for rotation of the rotor 1 around the axis of rotation 6. The aperture 14 extends through the rotor 1 in the axial direction 3. The laminated core 2 has laminations 7 arranged in an axial direction 3 and grooves 16 arranged circumferentially around the aperture 14. The inserts 10 extend in the axial direction 3 and are circumferentially arranged in each groove 16, and as illustrated in FIG. 1, are in contact with laminations 7. Each insert 10 has a circular cross section. Each groove 16 has a groove filing comprising a first material 8. The insert 10 fills up a second part of each groove 16 with a second FIG. 3 shows an exemplary embodiment of a device 37 for pressure die-casting of a cast metal region with a laminated core 2 and an insert 10 in a first tool 33 and in a second tool 34. In the laminated core 2, the insert 10 has been placed in the groove 16 and additional inserts in the additional grooves. Subsequently, the first tool 33 was arranged at the first axial end 4 of the laminated core 2, wherein the first tool 33 shapes the end region 18 of the cast metal region 13. Furthermore, the second tool 34 is arranged at the second axial end 5 of the laminated core 2 which shapes the additional end region 19. The device 37 for casting the cast metal region 13 comprises a heating device 38 which keeps the first material 8 ready in a liquid state as melt in a chamber 15. With pressure die-casting of the cast metal region 13, a valve 39 on the chamber 15 of the device 37 is opened and the first material 8 transported in a liquid state under high pressure by way of a drive 41 with a piston 40 into the first tool 33, the groove 16 and the additional grooves of the laminated core 2, and into the second tool 34. In FIG. 3 the directions 32 in which the first material 8 is transported in a step by way of several apertures 35 of the first tool 33 from the device 37 for casting, in particular pressure die-casting, of the cast metal region 13 into the first tool 33 and by way of the groove 16 and the additional grooves to the second axial end 5 are represented by arrows. The air which is inside the arrangement for casting the cast metal region 13, i.e. inside the device 37, of the first tool 33, the laminated core 2 or the second tool 34, can escape via vents 36 in one direction 64. After solidification of the first material 8 in the first tool 33, the laminated core 2 and the second tool 34, the cast metal region 13 with the end region 18 and the additional end region 19 consists of the first material 8.

In a further exemplary embodiment of a rotor having an insert, a first material has a lower melting point than the second material 12. The features described here of the further exemplary embodiment of the rotor are referred to by the same names as in the description of the exemplary embodiments of FIG. 1 to FIG. 5, FIG. 1 to FIG. 5 therefore also representing the further exemplary embodiment. However, in the further exemplary embodiment of the rotor the first material predominantly has a first alloy in which the mass fraction of the metal element 9 of the periodic table is at least 80%. A small mass fraction of the first alloy has an additional element of the periodic table, the mechanical stability of a cast metal region therefore being greater than in the case of the cast metal region 13 with comparable dimensions, which predominantly has one alloy in which the mass fraction of the metal element 9 is greater than 98%. The alloy in which the mass fraction of the metal element 9 is greater than 98% may, for example, be the first alloy of the cast metal region 13 of the exemplary embodiments of FIG. 1 to FIG. 5, in which an alloy with a mass fraction of at least 99.5% aluminum is used to cast the cast metal region 13. The additional element of the periodic table in the further exemplary embodiment of the rotor is copper. The first alloy in the further exemplary embodiment of the rotor is AlSi9Cu3. If additional figures analogous to FIG. 1 to FIG. 5 were to be created for the further exemplary embodiment of the rotor, the additional element of the periodic table Cu could be represented by filled circles similar to the unfilled circles in the cast metal region 13 and in the connection zone 11. Furthermore, a further exemplary embodiment of a series of rotors could be obtained for at least one electric machine with at least three rotors in which FIG. 3 is used and supplemented by an additional third rotor for an additional figure which corresponds to the exemplary embodiment of FIG. 1, wherein the first material according to the further exemplary embodiment of the rotor is present. The same insert 10 as in the exemplary embodiment according to FIG. 1 is used as an insert for the further exemplary embodiment of the rotor. During the production of the rotor according to the additional exemplary embodiment or during pressure die-casting of the cast metal region with a device according to FIG. 3, the first material can be made available on account of its lower melting point in a sufficiently liquid state in a sufficient quantity as melt for the high-quality advantageously homogenous cast metal region, in particular advantageously for an end region and an additional end region of the cast metal region, and for the bonded connection with advantageously high-quality connection properties. In addition, the first material with the additional element of the periodic table advantageously contributes to the laminated core being held together mechanically resistantly against environmental influences and more cost-effective production of the rotor being possible.

Figure 4:
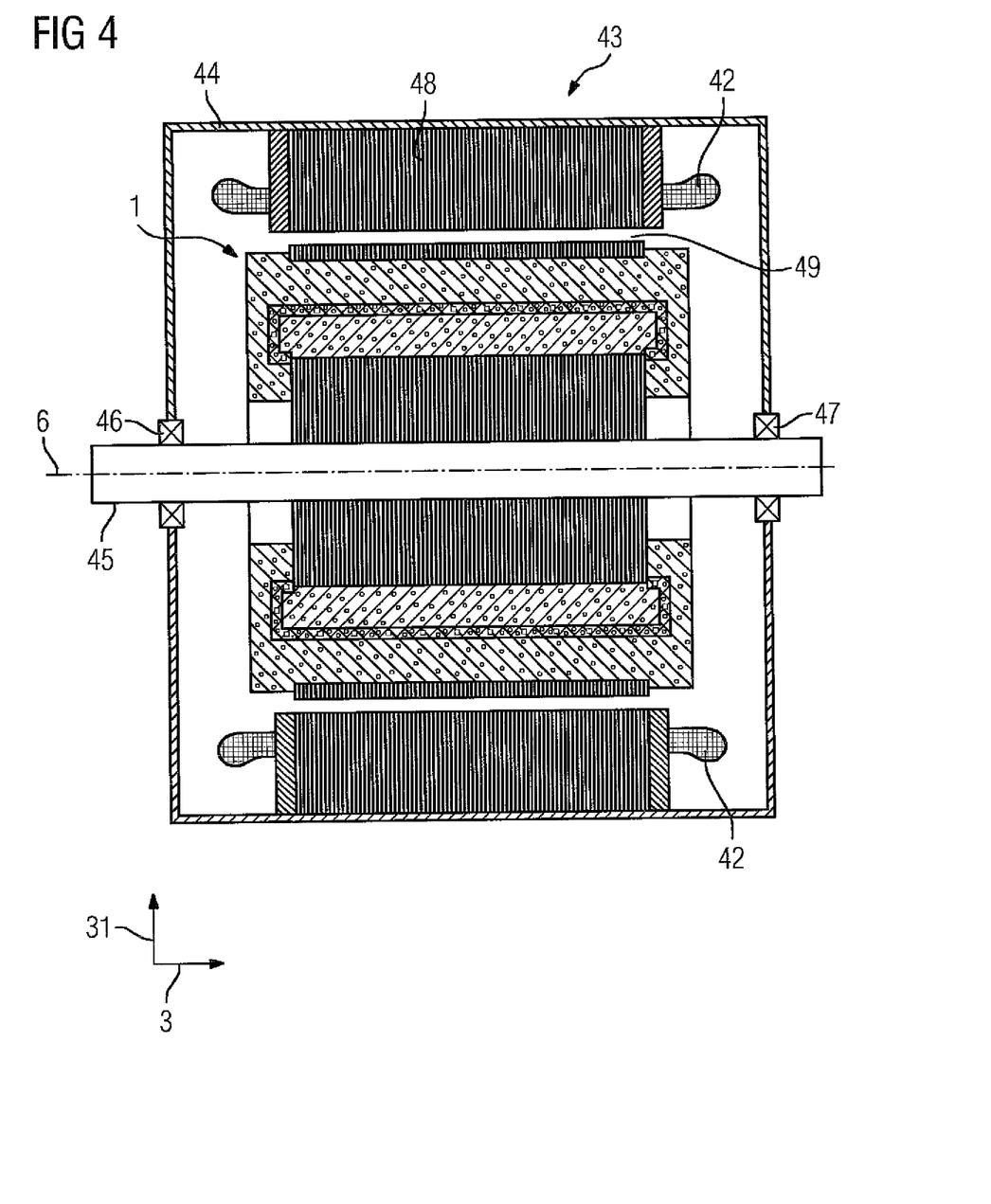

FIG. 4 shows an exemplary embodiment of an electric machine 43 with the rotor 1. The electric machine 43 has the rotor 1 and a stator 48. The cast metal region 13, the insert 10 and its connection in a bonded manner by means of a connection zone 11 enables an advantageous magnetic interaction between the rotor 1 and stator 48 by way of an air gap 49. The air gap 49 is demarcated perpendicularly to the axial direction 3 in directions 31 by the stator 48 and the rotor 1. In the exemplary embodiment of the electric machine 43, the rotor 1 has a facility for enabling magnetic interaction with the stator 48, in particular with a winding 42 fastened to the stator 48, by way of the air gap 49. In the exemplary embodiment of the electric machine 43, the facility comprises the cast metal region 13 with the cast sections 20, the insert 10, the connection zone 11, additional inserts and additional connection zones. Thus, the exemplary embodiment of the electric machine 43 is an asynchronous machine which has a cage rotor as rotor 1. The end region 18 of the cast metal region 13 connects the cast metal region 13 and the cast sections 20 in a bonded manner by means of the first material 8 to a short circuit ring. The cast metal region 13 and the cast sections 20, the insert 10 and the additional inserts are advantageously part of a shading coil which is shorted by means of the end region 18 of the cast metal region 13 as a short circuit ring at the first axial end 4 and the additional end region 19 of the cast metal region 13 as an additional short circuit ring at the second axial end 5.

The rotor 1 of the electric machine 43 has a shaft 45 for rotation of the rotor 1 around the axis of rotation 6 which extends along the axis of rotation 6 and to which the laminated core 2 is fastened. The shaft 45 is stored in a first end shield with the aid of a first storage device 46 and in a second end shield with the aid of a second storage device 47. A housing 44 of the electric machine 43 comprises the first and the second end shield.

Figure 5:
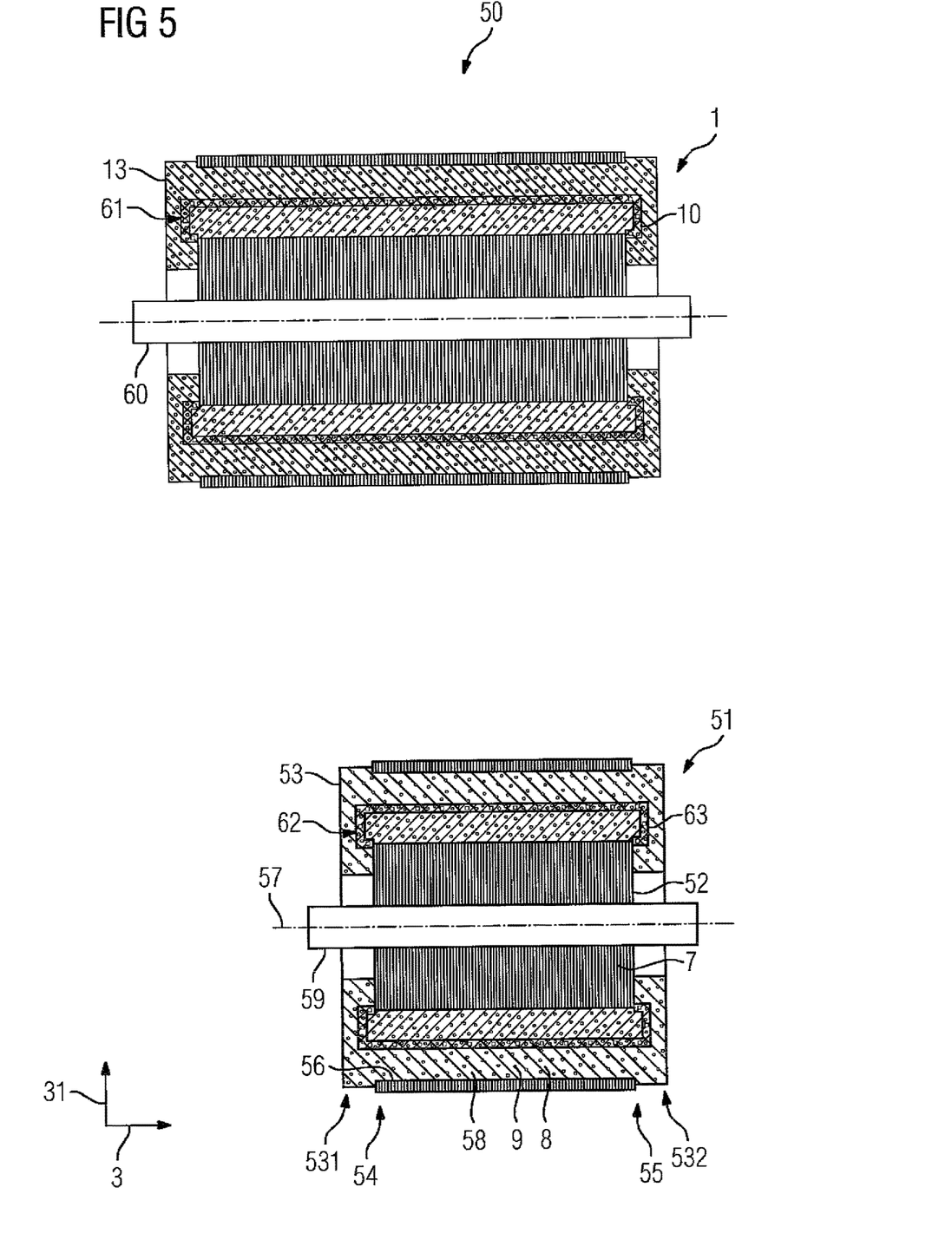

FIG. 5 shows an exemplary embodiment of a series 50 of rotors 1, 51 for at least one electric machine 43. The insert 10 has the cross-sectional area 61. A first rotor 1 of the series 50 is the rotor according to FIG. 1. A second rotor 51 of the series 50 has a second laminated core 52 which has laminations. 7 arranged in an axial direction 3 and a second groove 56, wherein the second laminated core 52 and the second groove 56 extend in the axial direction 3 from a third axial end 54 to a fourth axial end 55 along an axis of rotation 57. The second groove 56 has a second groove filling which comprises a fourth material 58, wherein the fourth material 58 has the metal element 9 of the periodic table. The second groove filling has a cast second metal region 53 which extends at the third axial end with a second end region 531 at least partially over the second laminated core 52 perpendicularly to the axial direction 3 in a first direction 31. A first volume which comprises the volume of the cast metal region 13 and the volume of the insert 10 is greater than a second volume which comprises the volume of the cast second metal region 53. As the second rotor 51 comprises a second insert 63, the second volume comprises the volume of the cast second metal region and the volume of the second insert 63. In the series 50, the length of the laminated core 2 of the first rotor 1, which is measured between the first axial end 4 and the second axial end 5 of the laminated core 2 of the first rotor 1, is greater than the length of the second laminated core 52, which is measured between the third axial end 54 and the fourth axial end 55 of the second laminated core 52. As the cross-sectional area 61 of the insert 10 has the same surface area as the cross-sectional area 62 of the second insert 63, the first volume is greater than the second volume. The fourth material 58 is the same as the first material 8 in the exemplary embodiment of the series 50.

As the first rotor 1 has additional inserts in additional grooves 161, the first volume also comprises the volumes of the additional inserts. The same also applies to the second rotor 51. As all the additional grooves 161 of the first rotor 1 and second rotor 51 have additional inserts, the first volume has the volume of the composite parts of the first rotor 1, which comprises the groove filling of all the grooves of the first rotor 1. Accordingly, the second volume has the volume of a second composite part of a second rotor 51 which comprises the groove filling of all the grooves of the second rotor 51. The first volume of the composite part is greater than the second volume of the second composite part.

In the series 50, the second rotor 51 has the second composite part, which has the cast second metal region 53 and the second insert 63, wherein the geometric dimensions of the second insert 63 are like the geometric dimensions of the insert 10. The geometric dimensions of the second insert 63 are the cross-sectional area 62 of the insert 63. The geometric dimensions of the insert 10 are the cross-sectional area 61 of the insert 10 in the series 50.

Advantageously cost-effectively the insert 10 and the second insert 63 as well as additional inserts which are arranged in the additional grooves of the first rotor 1 and the second rotor 51 can be produced from a prefabricated extruded section for a high-quality electric machine. Inter alia, a particular extruded section can be used for producing the inserts for many rotors of a series. Additional rotors of the series 50, for example, a third rotor and a fourth rotor, may differ advantageously cost-effectively in terms of the length of the laminated core, in terms of the diameter of the laminated core, in terms of the groove shape and/or a cross-sectional area of a punching in laminations of the laminated core and/or in terms of the second material 12 of the second insert 63. The use of inserts which differ in terms of the second material 12, i.e. in terms of the second alloy, is advantageously cost-effective, inter alia, also as a result of the prefabricated extruded sections of the various second materials 12.

If the insert 10, the second insert 63 or the additional inserts should have a metal coating on the surfaces, advantageously for the bonded connection, in particular in the case of prefabricated extruded sections, an oxide layer present on the surfaces can be removed.

Although the invention has been described in more detail by the preferred exemplary embodiments, it is not limited by the disclosed examples and other variations may certainly be derived by a person skilled in the art without departing from the scope of the invention.

What is claimed is:

1. A rotor for an electric machine, comprising:
   a laminated core having laminations arranged in an axial direction, and a groove, said laminated core and said groove extending in the axial direction from a first axial end to a second axial end along an axis of rotation;
   a groove filling received in the groove and including a first material having a metal element of the periodic table, said groove filling having a cast metal region which has at the first axial end an end region sized to extend at least partially over the laminated core in a first direction perpendicular to the axial direction, said cast metal region configured to extend through the groove from the first axial end to the second axial end to fill up a first part of the groove with the first material perpendicularly to the axial direction in the first direction; and
   an insert having a circular cross-section received in the groove to fill up a second part of the groove with a second material perpendicularly to the axial direction in the first direction, said second material directly contacting the laminations of the laminated core and containing the metal element of the periodic table, with the insert predominantly made of the second material and connected with the cast metal region in a bonded manner via a connection zone, said connection zone having an additional metal element of the periodic table,
   wherein said connection zone is not formed on edges of the laminations of the laminated core extending in the first direction perpendicular to the axial direction and also not formed between the laminations and the second material,
   wherein the second material has a melting point which is lower than a melting point of the first material,
   wherein the first material predominantly has a first alloy in which the metal element of the periodic table has a greatest mass fraction.

2. The rotor of claim 1, wherein the insert has an end sized to extend into the end region of the cast metal region and connected to the cast metal region in a bonded manner via the connection zone.

3. The rotor of claim 1, wherein the second material predominantly has a second alloy in which the metal element of the periodic table has a greatest mass fraction.

4. The rotor of claim 1, wherein the second material is the same as the first material.

5. The rotor of claim 1, wherein the metal element of the periodic table is aluminum.

6. A series of rotors for at least one electric machine, comprising
   a first rotor including a laminated core having laminations arranged in an axial direction, and a groove, said laminated core and said groove extending in the axial direction from a first axial end to a second axial end along an axis of rotation, a groove filling received in the groove and including a first material having a metal element of the periodic table, said groove filling having a cast metal region which has at the first axial end an end region sized to extend at least partially over the laminated core in a first direction perpendicular to the axial direction, saki cast metal region configured to extend through the groove from the first axial end to the second axial end to fill up a first part of the groove with the first material perpendicularly to the axial direction in the first direction, and an insert having a circular cross-section received in the groove to fill up a second part of the groove with a second material perpendicularly to the axial direction in the first direction, said second material directly contacting the laminations of the laminated core and containing the metal element of the periodic table, with the insert predominantly made of the second material and connected with the cast metal region in a bonded manner via a connection zone, said connection zone having an additional metal element of the periodic table; and
   a second rotor including a laminated core having laminations arranged in an axial direction, and a groove, said laminated core and said groove extending in the axial direction from a third axial end to a fourth axial end along an axis of rotation, a groove filling received in the groove of the second rotor and including a material having a metal element of the periodic table, said groove filling of the second rotor having a cast metal region which has at the third axial end an end region sized to extend at least partially over the laminated core of the second rotor in a direction perpendicular to the axial direction,
   wherein the cast metal region of the first rotor and the insert of the first rotor jointly define a first volume which is greater than a second volume defined by the cast metal region of the second rotor, wherein said connection zone is not formed on edges of the laminations of the laminated core extending in the first direction perpendicular to the axial direction and also not formed between the laminations and the second material, wherein the second material has a melting point which is lower than a melting point of the first material, wherein the first material predominantly has a first alloy in which the metal element of the periodic table has a greatest mass fraction.

7. The series of claim 6, wherein the second rotor has a composite part which includes the cast metal region and an insert, said insert of the composite part defined by a geometric dimension which corresponds to a geometric dimension of the insert of the first rotor.

8. An electric machine, comprising:
a rotor including a laminated core having laminations arranged in an axial direction, and a groove, said laminated core and said groove extending in the axial direction from a first axial end to a second axial end along an axis of rotation, a groove filling received in the groove and including a first material having a metal element of the periodic table, said groove filling having a cast metal region which has at the first axial end an end region sized to extend at least partially over the laminated core in a first direction perpendicular to the axial direction, said cast metal region configured to extend through the groove from the first axial end to the second axial end to fill up a first part of the groove with the first material perpendicularly to the axial direction in the first direction, and an insert having a circular cross-section received in the groove to fill up a second part of the groove with a second material perpendicularly to the axial direction in the first direction, said second material directly contacting the laminations of the laminated core and containing the metal element of the periodic table, with the insert predominantly made of the second material and connected with the cast metal region in a bonded manner via a connection zone, said connection zone having an additional metal element of the periodic table; and
a stator interacting with the rotor,
wherein said connection zone is not formed on edges of the laminations of the laminated core extending in the first direction perpendicular to the axial direction and also not formed between the laminations and the second material,
wherein the second material has a melting point which is lower than a melting point of the first material,
wherein the first material has a first alloy in which the metal element of the periodic table has a greatest mass fraction.

9. A method for producing a rotor, comprising:
placing in a groove of a laminated core having laminations extending in an axial direction an insert made of a material containing a metal element of the periodic table so that the material of the insert directly contacts the laminations, wherein the insert has a circular cross-section;

casting a groove filling made of a material containing a metal element of the periodic table into the groove to define a cast metal region, such that during casting, the insert and the cast metal region are connected in a bonded manner via a connection zone made of a material containing a metal element of the periodic table, with the cast metal region extending though the groove from a first axial end to a second axial end of the laminated core to fill up a first part of the groove, and with the insert filling up a second part of the groove, and thereby coating a surface of the insert with the material of the connection zone with a coating; and melting or fusing the coating with the material of the groove filling during casting of the cast metal region, wherein said connection zone is not formed on edges of the laminations of the laminated core extending in a first direction perpendicular to the axial direction and also not formed between the laminations and the material of the insert, wherein the material of the groove filling has a melting point which is lower than a melting point of the material of the insert, wherein the material of the groove filling predominantly has a first alloy in which the metal element of the periodic table has a greatest mass fraction.

10. The method of claim 9, wherein casting includes pressure die-casting.

11. A method of installing an insert in a rotor for an electric machine, comprising:
placing in a groove of a laminated core having laminations extending in an axial direction an insert made of a material containing a metal element of the periodic table so that the material of the insert directly contacts the laminations, wherein the insert has a circular cross-section; and casting a groove filling made of a material containing a metal element of the periodic table into the groove to define a cast metal region, such that during casting, the insert and the cast metal region are connected in a bonded manner via a connection zone made of a material containing a metal element of the periodic table, with the cast metal region extending though the groove from a first axial end to a second axial end of the laminated core to fill up a first part of the groove, and with the insert filling up a second part of the groove, and thereby coating a surface of the insert with the material of the connection zone with a coating, wherein said connection zone is not formed on edges of the laminations of the laminated core extending in a first direction perpendicular to the axial direction and also not formed between the laminations and the material of the insert, wherein the material of the groove filling has a melting point which is lower than a melting point of the material of the insert, wherein the material of the groove filling predominantly has a first alloy in which the metal element of the periodic table has a greatest mass fraction.

* * * * *

UNITED STATES PATENT AND TRADEMARK OFFICE
CERTIFICATE OF CORRECTION

PATENT NO. : 11,171,551 B2
APPLICATION NO. : 15/036644
DATED : November 9, 2021
INVENTOR(S) : Pfaller et al.

Page 1 of 1

It is certified that error appears in the above-identified patent and that said Letters Patent is hereby corrected as shown below:

On the Title Page

Item (30) Foreign Application Priority Data:
Replace "EP 13192929" with the correct --EP 13192929.1--.

In the Claims

In Column 16, Claim 6, Line 37 replace "saki cast metal" with --said cast metal--.
In Column 17, Claim 8, Line 50 replace "first material has" with --first material predominantly has--.

Signed and Sealed this
Twelfth Day of April, 2022

Drew Hirshfeld
*Performing the Functions and Duties of the*
*Under Secretary of Commerce for Intellectual Property and*
*Director of the United States Patent and Trademark Office*